United States Patent
Niu et al.

(10) Patent No.: US 10,399,375 B2
(45) Date of Patent: Sep. 3, 2019

(54) PRIMER COMPOSITIONS

(71) Applicant: Hewlett-Packard Development Company, L.P., Spring, TX (US)

(72) Inventors: Bor-Jiunn Niu, San Diego, CA (US); Tao Chen, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/569,585

(22) PCT Filed: Aug. 28, 2015

(86) PCT No.: PCT/US2015/047459
§ 371 (c)(1),
(2) Date: Oct. 26, 2017

(87) PCT Pub. No.: WO2017/039586
PCT Pub. Date: Mar. 9, 2017

(65) Prior Publication Data
US 2018/0290472 A1    Oct. 11, 2018

(51) Int. Cl.
| | |
|---|---|
| *B41M 5/52* | (2006.01) |
| *C09D 129/04* | (2006.01) |
| *D21H 17/36* | (2006.01) |
| *D21H 17/66* | (2006.01) |
| *D21H 19/20* | (2006.01) |
| *D21H 19/82* | (2006.01) |
| *C09D 133/00* | (2006.01) |
| *D21H 17/00* | (2006.01) |

(52) U.S. Cl.
CPC ............ *B41M 5/5254* (2013.01); *B41M 5/52* (2013.01); *B41M 5/5218* (2013.01); *B41M 5/5245* (2013.01); *C09D 129/04* (2013.01); *C09D 133/00* (2013.01); *D21H 17/36* (2013.01); *D21H 17/66* (2013.01); *D21H 17/74* (2013.01); *D21H 19/20* (2013.01); *D21H 19/82* (2013.01)

(58) Field of Classification Search
CPC .............. B41M 5/5254; B41M 5/5245; B41M 5/5213; C09D 129/04; D21H 19/20

USPC ........................................................ 524/398
See application file for complete search history.

(56) References Cited

U.S. PATENT DOCUMENTS

| | | | |
|---|---|---|---|
| 5,270,103 A | * | 12/1993 | Oliver .................. B41M 5/5254 162/135 |
| 6,534,155 B1 | | 3/2003 | Sharma et al. |
| 2003/0114573 A1 | | 6/2003 | Cuch et al. |
| 2006/0014014 A1 | | 1/2006 | Van Den Abbeele et al. |
| 2008/0004392 A1 | | 1/2008 | Qiu et al. |
| 2011/0091666 A1 | * | 4/2011 | Wang ........................ B41M 5/52 428/32.21 |
| 2012/0034398 A1 | * | 2/2012 | Wang ........................ B41M 5/52 428/32.21 |
| 2013/0293647 A1 | * | 11/2013 | Dannhauser ......... B41M 5/0017 347/102 |
| 2014/0212591 A1 | | 7/2014 | Swei et al. |

FOREIGN PATENT DOCUMENTS

| | | |
|---|---|---|
| CN | 1518504 | 8/2004 |
| CN | 101104351 | 1/2008 |
| CN | 104339911 | 2/2015 |
| EP | 1101625 | 5/2002 |
| WO | 2009145762 | 12/2009 |
| WO | 2014193571 | 12/2014 |

OTHER PUBLICATIONS

International Search Report and Written Opinion dated May 2, 2016 for PCT/US2015/047459; Applicant Hewlett-Packard Development Company L.P.
European Search Report dated Nov. 24, 2017 for PCT/US2015/047459; Applicant Hewlett-Packard Development Company, L.P.

* cited by examiner

*Primary Examiner* — Hui H Chin
(74) *Attorney, Agent, or Firm* — Thorpe North & Western LLP

(57) ABSTRACT

The present disclosure is drawn to primer compositions, which can include a polyvinyl alcohol, a cationic salt, and water. The polyvinyl alcohol can have a weight average molecular weight from about 50,000 Mw to about 250,000 Mw. The cationic salt can be present in an amount of at least 15 wt % of all dry components of the primer composition. The polyvinyl alcohol and cationic salt together can make up at least 30 wt % of all dry components of the primer composition.

18 Claims, 2 Drawing Sheets

PRIMER COMPOSITIONS

BACKGROUND

There are several reasons that inkjet printing has become a popular way of recording images on various media surfaces, particularly paper. Some of these reasons include low printer noise, variable content recording, capability of high speed recording, and multi-color recording. Additionally, these advantages can be obtained at a relatively low price to consumers. Though there has been great improvement in inkjet printing, accompanying this improvement are increased demands by consumers in this area, e.g., higher speeds, higher resolution, full color image formation, increased stability, etc. Additionally, inkjet printing is becoming more prevalent in high speed commercial printing markets, competing with more laborious offset and gravure printing technologies. Coated media typically used for these more conventional types of printing, e.g., offset or gravure printing, can perform somewhat acceptably on high speed inkjet printing devices, but these types of media is not always acceptable for inkjet technology as it relates to image quality, gloss, abrasion resistance, and other similar properties.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1:
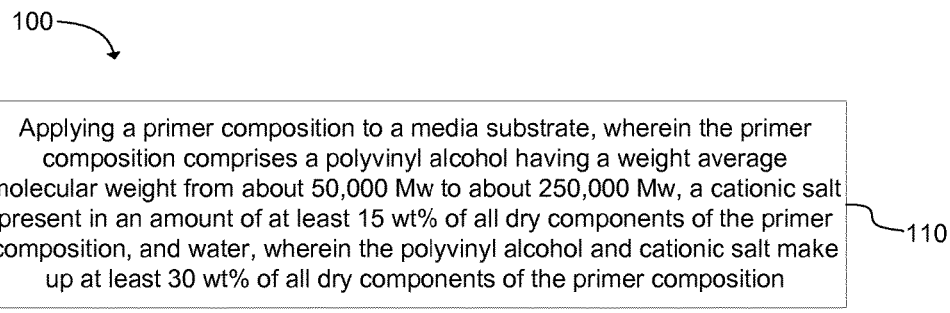
FIG. 1 is a flow chart of a method of coating a media substrate in accordance with an example of the present technology.

Reference will now be made to several examples that are illustrated herein, and specific language will be used herein to describe the same. It will nevertheless be understood that no limitation of the scope of the disclosure is thereby intended.

DETAILED DESCRIPTION

The present disclosure is drawn to primer compositions. In some examples, the primer compositions can be ink-receiving primer compositions, in that the primer compositions can be used to form coatings for receiving inks such as inkjet inks. The primer compositions can be applied to a substrate to form an ink-receiving layer on the substrate before printing inkjet ink over or onto the primer layer. In one example, the primer composition can be applied to offset coated paper. Typically, offset coated papers are significantly different from paper specifically designed for inkjet printing. Commercial offset paper often includes a smooth, non-porous surface coating that is difficult to penetrate by aqueous liquids. In many cases, offset coatings include inorganic pigments such as calcium carbonate and clay, as well as hydrophobic polymers that interact poorly with water-based inks. Polymers used in offset media often include latex binders, polystyrenes, polyolefins (polypropylene, polyethylene, polybutadiene), polyesters (PET), polyacrylates, polymethacrylates, poly (maleic anhydride), and others. As a result of the hydrophobic and non-porous properties of offset media, water-based inks printed on offset media often have poor image quality, dry very slowly (sometimes taking more than 24 hours), and have poor durability after drying.

The primer compositions described herein can be applied to a media substrate to improve the ability of the substrate to receive water-based inks. For example, the primer compositions can improve the durability of images printed with water-based inks. In one example, a media substrate that is normally less suitable for printing with water-based inks, such as offset media, can be coated with the primer composition prior to printing. This coated media substrate can have improved interaction with water-based inks and improved printed image durability after the ink dries on the coated media substrate The primer composition can include a water soluble polymeric binder. By "water soluble," it is noted that the polymeric binder can be at least partially water soluble (at least 5%), mostly water soluble (at least 50%), or in some examples, fully water soluble (at least 99%) in the primer composition. Water soluble polymers can interact better with water-based inks compared to the hydrophobic coatings of offset media. However, many types of water soluble polymeric binder exhibit poor dry smearfastness immediately after printing due to poor wet film strength. For example, starch, cellulose, polyethylene oxide, and polyvinylpyrrolidone (PVP) are examples of water soluble polymers that have poor dry smearfastness when used in primers on offset media.

Poor dry smearfastness immediately after printing can be problematic because the printed image can be easily smeared if the image is rubbed or otherwise disturbed soon after printing. For example, when using an HP high speed Web Press®, the printing is a continuous process and the paper is rewound as a roll after printing. The image or text printed on the paper can be smeared when the paper is rewound if the dry durability is poor. Prior solutions to this problem have included reducing the printing speed, increasing drying temperature, or increasing the drying zone. Several disadvantages are associated with these solutions, however. For example, increasing the drying time leads to reducing the production rate, which increases the cost or time cost of printing. Harsh drying conditions can cause increased paper cockle. Increasing the size of the drying zone makes the printing system occupy a larger space, which increases the total cost or space cost of printing.

Surprisingly, certain primer compositions including polyvinyl alcohols have been found to provide much better dry smearfastness immediately after printing. Thus, the primer composition can include polyvinyl alcohol as a water soluble polymeric binder. In addition to the polyvinyl alcohol, the primer composition can include a cationic salt. These components are present at relatively high concentrations, as will be described hereinafter. In this manner, the hydroxyl groups of the polyvinyl alcohol can interact with the cationic salt to form a complex-like structure. This structure can result in enhanced wet film strength of the primer layer and the ink printed on top of the primer layer. When inkjet ink is printed on top of the primer, the ink can have improved instant dry smearfastness.

Additionally, polyvinyl alcohols in a medium-to-high molecular weight range have been found to be provide especially good instant dry smearfastness and instant wet smearfastness. For example, polyvinyl alcohols with a weight average molecular weight greater than about 50,000

Mw have been found to provide good dry and wet smearfastness. In a further example, the polyvinyl alcohol can have a weight average molecular weight from about 50,000 Mw to about 250,000 Mw.

The primer composition can be used on offset paper in a continuous printing system such as the HP high speed Web Press® mentioned above. In some cases, the instant smearfastness of the printed image can be such that no smearing occurs when the printed paper is rewound into a roll after printing. Because the printed image does not need extra time to dry before rewinding the paper, the press can run at a high speed. These advantages can be obtained without compromising print quality.

With this description in mind, in some examples, the present technology provides a primer composition. The primer composition can include a polyvinyl alcohol having a weight average molecular weight from about 50,000 to about 250,000 Mw, a cationic salt, and water. Although various amounts of the polyvinyl alcohol and the cationic salt can be used, in one aspect, the cationic salt can be included in an amount of at least 15 wt % of all dry components of the primer composition. Additionally, the polyvinyl alcohol and the cationic salt together can make up at least 30 wt % of all dry components of the primer composition.

More generally, the amount of polyvinyl alcohol in the primer composition can be sufficient to act as a binder to bind the remaining ingredients of the primer composition to the substrate. In some examples, the polyvinyl alcohol content of the primer composition can be within a range such that there is sufficient polyvinyl alcohol to act as a binder, but not so much that the ink-receiving properties of the primer are compromised. As an example, too much binder can, in some cases, make the primer layer less porous and negatively impact the solution stability of the primer. This can interfere with the interaction between the primer layer and water-based inks.

In accordance with this, the primer composition can include polyvinyl alcohol in an amount from 8 wt % to 70 wt %, 8 wt % to 50 wt %, or 8 wt % to 30 wt %, based on the weight of all dry components of the primer composition. In further examples, the primer composition can include polyvinyl alcohol in an amount of at least 10 wt % of all dry components of the primer composition. For example, the primer composition can include polyvinyl alcohol in an amount from 10 wt % to 70 wt %, 10 wt % to 50 wt %, 10 wt % to 30 wt %, or 10 wt % to 20 wt %, based on the weight of all dry components of the primer composition.

The polyvinyl alcohol can have a weight average molecular weight from about 50,000 Mw to about 250,000 Mw. Polyvinyl alcohols with molecular weights in this range can provide better durability compared to polyvinyl alcohols with lower molecular weights. Without being bound to a particular theory, it is believed that the increased durability is due to stronger hydrogen bonding interactions in the higher molecular weight polyvinyl alcohols. In further examples, the polyvinyl alcohol can have a weight average molecular weight from about 50,000 Mw to about 160,000 Mw or from about 50,000 Mw to about 100,000 Mw. In still further examples, the polyvinyl alcohol can have a weight average molecular weight from about 64,000 Mw to about 160,000 Mw or from about 74,000 Mw to about 160,000 Mw. Additionally, the molecular weight of a polyvinyl alcohol is related to its viscosity. In some cases, polyvinyl alcohols having a viscosity of at least 13 cP at 4 wt % solid content can provide good durability to printed images on the primer coating. In further examples, the polyvinyl alcohol can have a viscosity from 13 cP to 40 cP at 4 wt % solid content. In still further examples the polyvinyl alcohol can have a viscosity from 13 cP to 26 cP at 4 wt %. When a primer composition is formulated using the polyvinyl alcohol, the total amount of solids in the primer composition can be selected so that the viscosity of the primer composition is suitable for coating on a substrate. In some cases, polyvinyl alcohol with very high molecular weight can lead to very low total solids in the primer composition in order to have a suitable viscosity. However, very low total solids can in some cases negatively impact the durability of the primer coating.

The type of polyvinyl alcohol is not particularly limited with respect to the degree of hydrolysis of the polyvinyl alcohol. However, in some examples, the polyvinyl alcohol can have a degree of hydrolysis from about 78 mol % to about 100 mol %. In certain examples, the degree of hydrolysis can be from about 86 mol % to about 100 mol %. It is believed that the hydroxyl groups on the polyvinyl alcohol can interact with the cationic salt in the primer composition to form a complex-like structure, which improves the instant smearfastness of printed images on a primer coated substrate.

The polyvinyl alcohol can in some cases be a mixture of two or more types of polyvinyl alcohol. In such examples, the overall weight average molecular weight of the mixture of polyvinyl alcohols can be from about 50,000 Mw to about 250,000 Mw. Such a mixture of polyvinyl alcohols can also have any molecular weight, viscosity, degree of hydrolysis, and concentration falling within any of the ranges disclosed herein. In other words, whatever range is considered, it is understood that the range relates to the overall mixture of polyvinyl alcohol, whether there be one, two, three, etc., specific polyvinyl alcohol species present. In some examples, the polyvinyl alcohol can be a mixture of a first polyvinyl alcohol having a molecular weight less than about 50,000 Mw and a second polyvinyl alcohol having a molecular weight from about 50,000 Mw to about 250,000 Mw.

Non-limiting examples of polyvinyl alcohols that can be used in the primer composition include Poval® 3-88 (Kuraray America, Inc.) (14,000 Mw, 86.7-88.7 mol % hydrolysis); Poval® 4-88 (Kuraray America, Inc.) (31,000 Mw, 86.7-88.7 mol % hydrolysis); Poval® 4-98 (Kuraray America, Inc.) (27,000 Mw, 98-98.8 mol % hydrolysis); Poval® 5-88 (Kuraray America, Inc.) (37,000 Mw, 86.7-88.7 mol % hydrolysis); Poval® 8-88 (Kuraray America, Inc.) (67,000 Mw, 86.7-88.7 mol % hydrolysis); Poval® 13-88 (Kuraray America, Inc.) (86.7-88.7 mol % hydrolysis); Poval® 18-88 (Kuraray America, Inc.) (130,000 Mw, 86.7-88.7 mol % hydrolysis); Poval® 23-88 (Kuraray America, Inc.) (150,000 Mw, 86.7-88.7 mol % hydrolysis); Poval® 26-88 (Kuraray America, Inc.) (160,000 Mw, 86.7-88.7 mol % hydrolysis); and Poval® 40-88 (Kuraray America, Inc.) (205,000 Mw, 86.7-88.7 mol % hydrolysis).

In some cases, the primer composition can include a secondary water soluble polymeric binder. Non-limiting examples of such binders include starch, cellulose, polyethylene oxide, polyvinyl pyrrolidone, and others. The secondary binder can also be a mixture of two or more such water soluble polymeric binders. In some examples, if the secondary binder is present, then it can be present in a smaller amount than the polyvinyl alcohol. For example, the polyvinyl alcohol can make up at least 50 wt % by dry weight of all binders present in the primer composition. In still further examples, the polyvinyl alcohol can make up at least 80 wt % by dry weight of all binders present in the primer composition. In a specific example, the primer composition can be substantially free of or free of any water soluble polymeric binder other than the polyvinyl alcohol.

The cationic salt can be present in an amount sufficient to immobilize pigment colorants in the ink to be printed over the primer and to yield good image quality. In some examples, the primer composition can include the cationic salt in an amount from 15 wt % to 70 wt %, 25 wt % to 70 wt %, 30 wt % to 70 wt %, or 40 wt % to 50 wt %. As mentioned, the amounts of polyvinyl alcohol and cationic salt together can make up at least 30 wt % of all dry components of the primer composition. However, in one example, the polyvinyl alcohol can make up at least 40 wt %, at least 50 wt %, or at least 60 wt % of all dry components of the primer composition. In one example, the polyvinyl alcohol and cationic salt together can make up from 30 wt % to 70 wt % of all dry components of the primer composition.

The cationic salt can include a metal cation. In some examples, the metal cation can be sodium, calcium, copper, nickel, magnesium, zinc, barium, iron, aluminum, chromium, or other metal. The cationic salt can also include an anion. In some examples, the anion can be fluoride, chloride, iodide, bromide, nitrate, chlorate, acetate, or $RCOO^-$ where R is hydrogen or any low molecular weight hydrocarbon chain, e.g., C1 to C12. In a more specific example, the anion can be a carboxylate derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms may include formic acid, acetic acid, propionic acid, butyric acid, isobutyric acid, valeric acid, isovaleric acid, pivalic acid, and/or hexanoic acid. In some cases, the cationic salt can be a polyvalent metal salt made up of a divalent or higher polyvalent metallic ion and an anion. In certain examples, the cationic salt can include calcium chloride, calcium nitrate, magnesium nitrate, magnesium acetate, and/or zinc acetate. In one aspect, the cationic salt can include calcium chloride or calcium nitrate ($CaCl_2$ or $Ca(NO_3)_2$). In one additional specific aspect, the cationic salt can include calcium chloride ($CaCl_2$). The cationic salt can also be a mixture of two or more different cationic salts. In such examples, the total amount of the mixture of cationic salts can be greater than 15 wt % of all dry components of the primer composition, or any of the other amounts of cationic salt disclosed herein. In other words, whatever range is considered, it is understood that the range relates to total concentrations of salts, whether there be one, two, three, etc., specific salt species present.

In addition to the polyvinyl alcohol and cationic salt, the primer composition can also include a latex polymer. In some examples, the latex polymer can be present in an amount from about 10 wt % to about 50 wt %. In further examples, the latex polymer can be present in an amount from 20 wt % to 30 wt %. Additionally, the primer composition can be predominantly (greater than 50 wt % by dry weight) made up of the latex polymer, the polyvinyl alcohol, and the cationic salt. In one example, the polyvinyl alcohol, cationic salt, and latex polymer can make up at least 80 wt % of all dry ingredients in the primer composition.

The latex polymer can be used to improve the film strength of the primer layer. In one example, the glass transition temperature (Tg) of the latex can be from 5° C. to 100° C. The latex polymer can be anionic, nonionic, or cationic. In some examples, the latex polymer can be a cationic latex polymer.

In other examples, the latex polymer can be made of polymers and copolymers including acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In another example, the latex polymer can include a vinyl acetate-based polymer, an acrylic polymer, a styrene polymer, a styrene-butadiene (SBR)-based polymer, a polyester-based polymer, a vinyl chloride-based polymer, an acid-based polymer, or the like. In one aspect, the latex particle can be a polymer or a copolymer including acrylic polymers, vinyl-acrylic copolymers and acrylic-polyurethane copolymers. In another aspect, the latex particle can be cationic acrylate latex. In one specific aspect, the latex can be a vinyl acetate polymer.

Generally, the latex polymer can include particles having a weight average molecular weight (Mw) of 5,000 Mw to 500,000 Mw. In one example, the latex particles can range from 150,000 Mw to 300,000 Mw. In some examples, the average particle diameter of the latex particles can be from 10 nm to 1 μm and, as other examples, from 10 nm to 500 nm, and in yet other examples, from 50 nm to 250 nm. The particle size distribution of the latex is not particularly limited, and either latex having a broad particle size distribution or latex having a mono-dispersed particle size distribution may be used. It is also possible to use two or more kinds of polymer fine particles each having a mono-dispersed particle size distribution in combination.

Many coating compositions for inkjet printing include inorganic pigments to improve the absorption properties of the coating. Such inorganic pigments can include, for example, clays such as kaolin clay or calcined clay, ground calcium carbonate, precipitated calcium carbonate, barium sulfate, titanium dioxide, silica, aluminum trihydrate, aluminum oxide, boehmite, or combinations thereof. However, in some examples the present primer composition can be substantially devoid of inorganic pigments. In other examples, the primer composition can include an inorganic pigment. In some examples, the primer composition can include an inorganic pigment in an amount of about 5 wt % or less of all dry components of the primer composition. Thus, the primer composition can include a relatively small amount of inorganic pigment, such as less than 5 wt %. In certain examples, the primer composition can be acidic and can include an inorganic pigment that is compatible with acid, such as a clay.

In further examples, the primer composition can include other additives such as slip aids that contribute to abrasion resistance and coefficient of friction (COF) reduction. For example, a wax can be included as a slip aid. Suitable waxes can include particles of a synthetic wax, natural wax, combinations of a synthetic wax and a natural wax, combinations of two or more different synthetic waxes, or combinations of two or more different natural waxes, for example. In some examples, the synthetic wax can include polyethylene, polypropylene, polybutadiene, polytetrafluoroethylene, polyvinylfluoride, polyvinyldiene fluoride, polychlorotrifluoroethylene, perfluoroalkoxy polymer, perfluoropolyether, polyurethane, polyethylenechlorotrifluoroethylene, polyethylene-vinyl acetate, epoxy resin, silicone resin, polyamide resin, polyamide, or polyester resin. In some examples, the natural wax can include carnauba wax, paraffin wax, montan wax, candelilla wax, ouricury wax, sufarcane wax, retamo wax, or beeswax. In one example, the wax can be a polyethylene wax, such as a high density polyethylene wax. Commercially available slip aids that can be used include Michemshield® 29235 (Michelman, Inc.), Ultralube® E846 (KeimAdditec Surface GmbH), and Ultralube® D-806 (KeimAdditec Surface GmbH), for example. In some examples, a wax can be present in the primer composition at an amount of 1 wt % to 15 wt % of all dry ingredients in the primer composition. In other examples, the wax can be present in an amount of 5 wt % to 10 wt % of all dry ingredients in the primer composition.

The primer composition can also include other coating additives such as surfactants, rheology modifiers, defoamers, optical brighteners, biocides, pH controlling agents, dyes, and other additives for further enhancing the properties of the primer composition. The total amount of such optional coating additives can be present, individually, in the range of 0.01 wt % to 5 wt % of all dry ingredients of the primer composition.

The present technology also extends to methods of coating a media substrate. FIG. 1 is a flowchart of exemplary method of coating a media substrate 100. The method includes applying a primer composition to a media substrate, wherein the primer composition includes a polyvinyl alcohol having a weight average molecular weight from about 50,000 Mw to about 250,000 Mw, a cationic salt present in an amount of at least 15 wt % of all dry components of the primer composition, and water, wherein the polyvinyl alcohol and cationic salt make up at least 30 wt % of all dry components of the primer composition 110.

The primer composition used in the method can have any of the ingredients in the amounts described above. In a particular example, the method can include applying a primer composition that includes the polyvinyl alcohol in an amount from 10 wt % to 30 wt % of all dry ingredients in the primer composition, and a cationic salt in an amount from 15 wt % to 70 wt % of all dry ingredients in the primer composition. In another example, the method can include applying a primer composition in which polyvinyl alcohol, cationic salt, and latex polymer make up at least 80 wt % of all dry ingredients in the primer composition. In yet another example, the method can include applying a primer composition that is substantially devoid of inorganic pigments. In another example, the method can include applying a primer composition that includes an inorganic pigment in an amount of about 5 wt % or less of all dry components of the primer composition.

The composition can be applied to the substrate by any of a number of coating methods. In accordance with examples of the present disclosure, the substrate can be coated by spray coating, dip coating, cascade coating, roll coating, gravure coating, curtain coating, air knife coating, cast coating, Meyer rod coating, blade coating, film coating, metered size press coating, puddle size press coating, calendar stack, and/or by using other known coating techniques. The thickness selected for the coating layer can vary. In one example, the primer composition can be applied at a dry coat weight from 0.1 gsm to 20 gsm. In another example, the primer composition can be applied to the substrate at a dry coat weight from 0.3 gsm to 10 gsm. In another example, the primer composition can be applied to the substrate at a dry coat weight from 0.3 gsm to 5 gsm. In another example, the primer composition can be applied to the substrate at a dry coat weight from 0.3 gsm to 1 gsm.

The method of coating the media substrate can further include allowing a sufficient time for the primer layer to dry before printing ink on the primer layer. The primer layer can be dried with infrared lamp, hot air and combination thereof. The primer layer can retain from about 0.01 wt % to about 10 wt % water, based on the total weight of the coating, when the coating is dry enough to print on. In some examples, the coating can have from about 1 wt % to about 6 wt % water remaining when an image is printed on the coated substrate. Thus, it is understood that the "dry coat weight" described herein refers to dry components, even if some water remains behind in the final formulation coating.

Ink can be printed on the primer layer. Printing can occur when the primer layer is partially dry or fully dry (i.e. dry to the touch but still may include some residual water). In some cases, the ink can be a water-based ink such as a water-based inkjet ink. Inkjet inks generally include a colorant dispersed or dissolved in an ink vehicle. As used herein, "liquid vehicle" or "ink vehicle" refers to the liquid fluid in which a colorant is placed to form an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc.

Generally the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. In most instances, dyes are water soluble. Furthermore, as used herein, "pigment" generally includes pigment colorants, magnetic particles, aluminas, silicas, and/or other ceramics, organo-metallics or other opaque particles. In one example, the colorant can be a pigment.

Typical ink vehicle formulations can include water, and can further include co-solvents present in total at from 0.1 wt % to 40 wt %, depending on the jetting architecture, though amounts outside of this range can also be used. Further, additional non-ionic, cationic, and/or anionic surfactants can be present, ranging from 0.01 wt % to 10 wt %. In addition to the colorant, the balance or much of the remaining of formulation components can be purified water. Other solids can likewise be present in the inkjet ink, such as latex particles.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), ACTICIDE® (Thor Specialties Inc.) and combinations thereof.

The present technology also extends to coated media substrates. The media substrate can include a variety of types of base substrate, including paper media, nonporous media, swellable media, microporous media, photobase media, offset media, coated media, uncoated media, and other types of media including plastics, vinyl media, fabrics, woven substrate, etc. In certain examples, the substrate can be a swellable media, a microporous media, or an offset media. The primer composition according to the present technology can be especially useful for coating offset media, which typically has a hydrophobic surface that does not interact well with water based inks.

In one example, a coated media substrate according to the present technology can include a media substrate and a primer layer coated on a surface of the media substrate. The primer layer can include a polyvinyl alcohol having a weight average molecular weight from about 50,000 Mw to about 250,000 Mw and a cationic salt present in an amount of at least 15 wt % of all dry components of the primer layer. The polyvinyl alcohol and cationic salt together can make up at least 30 wt % of all dry components of the primer layer.

Figure 2:
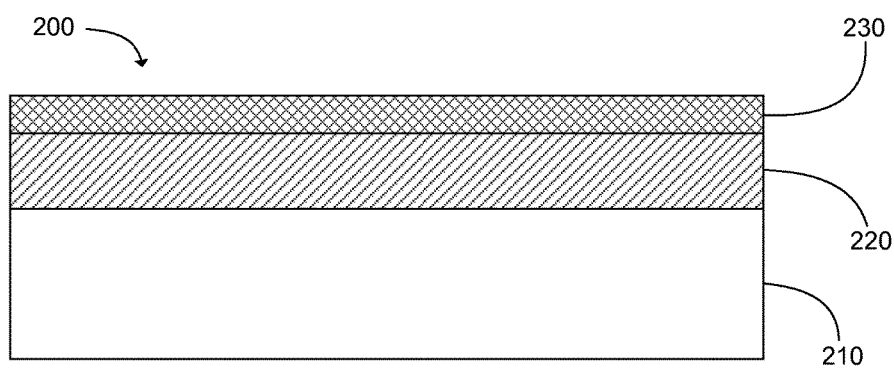
FIG. 2 shows a cross-sectional view of a coated media substrate in accordance with an example of the present technology.

FIG. 2 shows an example of a coated media substrate 200. A base substrate 210 is coated with a primer layer 220. On top of the primer layer, ink jet ink 230 can be printed to form a printed image. The image can have improved instant dry smearfastness after printing.

Figure 3:
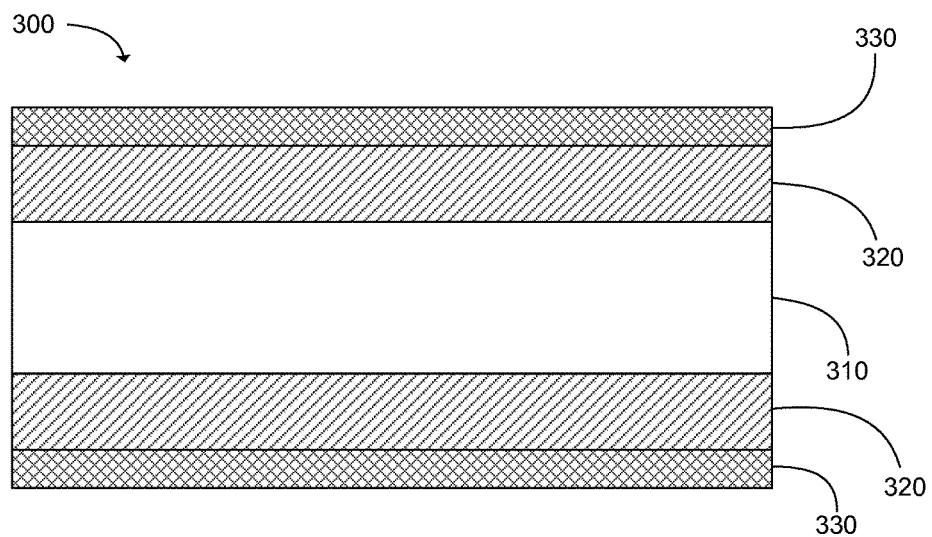
FIG. 3 shows a cross-sectional view of a coated media substrate in accordance with an example of the present technology.

FIG. 3 shows another example of a coated media substrate 300. In this example, the base substrate 310 has a primer layer 320 coated on both sides of the base substrate. Ink jet ink 330 is used to print images one or on both sides of the coated substrate. Thus, the coated media substrate can be used for double sided printing. Although not shown in the figures, the base substrate can also include its own coating, such as the hydrophobic coating on offset paper. Certain coatings (or pre-coatings) described herein can often already be present as part of a substrate, and these coatings are not the same as the primer layer primarily discussed in the context of the present disclosure. Offset media or photobase, for example, already include coatings on one or both side of a substrate material (and thus are considered to be part of the base substrate). The primer compositions of the present disclosure, conversely, are those which are overcoated with respect to the pre-applied coatings, or alternatively, to substrates that are not already pre-coated. Such coatings, i.e. the pre-coating and/or the primer compositions of the present disclosure, can be present on either one side of a media substrate or both.

It is noted that, as used in this specification and the appended claims, the singular forms "a," "an," and "the" include plural referents unless the content clearly dictates otherwise.

"Substrate" or "media substrate" includes any base material that can be coated in accordance with examples of the present disclosure, such as film base substrates, polymer substrates, conventional paper substrates, photobase substrates, offset media substrates, and the like. Further, pre-coated and film coated substrates can be considered a "substrate" that can be further coated in accordance with examples of the present disclosure.

"Water soluble polymer binder" includes any hydrophilic or hydrophilic/hydrophobic blend of polymer material that can be used to bind particulates together to form a coating in accordance with examples of the present disclosure.

"Slip aid" refers to materials that can be added to coating compositions herein to provide abrasion resistance to coatings of the present disclosure.

"Instant dry smearfastness" refers to the ability of a printed image to resist smearing when rubbed with an instrument such as a finger or an eraser, immediately after printing or within a short time of being printed. The short time can be, for example, from 1 second to 30 seconds, from 1 second to 20 seconds, or from 5 seconds to 10 seconds. In some cases, the short time can be the time used for a printed image to travel from the inkjet printer to a rewinding roll. In one example, a printed image on an HP T230 Web Press® takes from 5 seconds to 10 seconds to reach the rewinder after being printed.

"Instant wet smearfastness" refers to the ability of a printed image to resist smearing when rubbed with a wet instrument such as a wet finger immediately after printing or within a short time of being printed. The short time can be, for example, from 1 second to 30 seconds, from 1 second to 20 seconds, or from 5 seconds to 10 seconds. In some cases, the short time can be the time used for a printed image to travel from the inkjet printer to a rewinding roll. In one example, a printed image on an HP T230 Web Press® takes from 5 seconds to 10 seconds to reach the rewinder after being printed.

When referring to "high speed" as it is related to a digital printing press, presses such as the HP T230 Web Press® or the HP T350 Web Press® exhibit printing speeds that are commensurate of what is considered to be "high speed." For example, the HP T350 Web Press® can print on media at a rate of 400 feet per minute. This capability would be considered high speed. In another example, and more generally, printing at 100 feet per minute would also be considered high speed.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the coated media substrate, the method of coating a substrate, or the primer compositions herein, each of these discussions can be considered applicable to each of these examples, whether or not they are explicitly discussed in the context of that example. Thus, for example, in discussing details about the coated media substrate per se, such discussion also refers to the methods and primer compositions described herein, and vice versa.

The following examples illustrate some of the primer compositions, coated media substrates, systems, and methods that are presently known. However, it is to be understood that the following are only exemplary or illustrative of the application of the principles of the present compositions, systems, and methods. Numerous modifications and alternative compositions, systems, and methods may be devised without departing from the spirit and scope of the present disclosure. The appended claims are intended to cover such modifications and arrangements. Thus, while the examples have been described above with particularity, the following provide further detail in connection with what are presently deemed to be the acceptable examples.

EXAMPLES

Formulation Examples 1-8 were prepared according to Table 1. Examples 3-8 are examples prepared according to the present technology and Examples 1-2 are comparative examples.

TABLE 1

Example Formulations

| Ingredient Dry Wt % | Example No. | | | | | | | |
|---|---|---|---|---|---|---|---|---|
| | 1 | 2 | 3 | 4 | 5 | 6 | 7 | 8 |
| Poval ® 4-88 (Mw - 31,000; hydrolysis level - 88%) | 18 | | | | | 10 | 8 | 8 |
| Poval ® 4-98 (Mw - 31,000; hydrolysis level - 98%) | | 18 | | | | | | |
| Poval ® 18-88 (Mw - 130,000; hydrolysis level - 88%) | | | 18 | | | 8 | 4 | |
| Poval ® 26-88 (Mw - 160,000; hydrolysis level - 88%) | | | | 18 | | | | 4 |
| Poval ® 40-88 (Mw - 205,000; hydrolysis level - 88%) | | | | | 18 | | | |
| Raycat ® 105 (cationic latex) | 26 | 26 | 26 | 26 | 26 | 26 | 26 | 26 |
| Ultralube ® D-806 (polyethylene wax) | 9 | 9 | 9 | 9 | 9 | 9 | 9 | 9 |
| Calcium chloride | 45 | 45 | 45 | 45 | 45 | 45 | 45 | 45 |
| TEGO ® Wet 510 (surfactant) | 2 | 2 | 2 | 2 | 2 | 2 | 2 | 2 |

Poval ® (from Kuraray America, Inc.);
Raycat ® 105 (from Specialty Polymers, Inc.);
Ultralube ® (from Keim-Additec Surface GmbHO); and
TEGO ® (from Evonik Resource Efficiency GmbH).

The example formulations 1-8 were each coated onto Sterling® Ultra Gloss (Verso Corporation), 60# paper with 2 g/m² of dry coating weight. Samples were printed with an HP CM8060 MFP Edgeline printer, from Hewlett-Packard Co., Palo Alto, Calif., USA (HP), using HP A50 pigment inks (i.e., aqueous inkjet ink for digital inkjet printing). The printing process used involved 2 passes and six dry spin conditions to mimic high-speed, digital, web press inkjet printing. Dry and wet smearfastness refer to the ability of the printed image to resist appearance degradation upon rubbing or smearing the image by dry or wet finger. For the dry and wet finger smearfastness tests, a dry or wet finger was placed against a printed area, pushed with force of about 50 g/in², and drawn toward the tester. The finger was then released to check the tested area.

The results of the dry finger smearfastness test and wet finger smearfastness test are shown in Table 2. For the dry and wet finger smearfastness tests, the visual ranking is based on a 1 to 5 scale, with 1 being the worst and 5 being the best. A ranking equal to or greater than 3 is considered good and acceptable. A ranking below 3 is considered poor and not acceptable.

TABLE 2

Visual Ranking of Performance

| | Example No. | | | | | | | |
|---|---|---|---|---|---|---|---|---|
| | 1 | 2 | 3 | 4 | 5 | 6 | 7 | 8 |
| Dry Finger Smearfastness | 3 | 2.75 | 4 | 4 | 4 | 3.5 | 3 | 3.25 |
| Dry Eraser Smearfastness | 2.5 | 2.5 | 3 | 3 | 3.5 | 3 | 3 | 3 |

Examples 3-8 provided good results in both the dry finger smearfastness and dry eraser smearfastness tests. Comparative examples 1-2, however, provided less desirable results in both categories. These results show that the polyvinyl alcohols with weight average molecular weights greater than about 50,000 Mw provided better durability than the lower molecular weight polyvinyl alcohols. Examples 6-8 included a mixture of a first polyvinyl alcohol having a molecular weight below 50,000 Mw and a second polyvinyl alcohol having a molecular weight above 50,000 Mw. In these examples, the overall weight average molecular weights of the mixtures of polyvinyl alcohols were, on average, approximately 75,000 Mw for Example 6; 64,000 Mw for Example 7; and 74,000 Mw for Example 8.

The viscosity at 100 RPM was tested for each of the example formulations at 20% solids. The viscosities are shown in Table 3.

TABLE 3

Viscosity of Example Formulations

| | Example No. | | | | | | | |
|---|---|---|---|---|---|---|---|---|
| | 1 | 2 | 3 | 4 | 5 | 6 | 7 | 8 |
| Viscosity (cP) at 100 RPM | 31 | 36 | 89 | 138 | 200 | 42 | 32 | 35 |

Although Examples 3, 4 and 5 had the best wet and dry smearfastness, Examples 7, 8 and 9 had good wet and dry smearfastness while also having much lower viscosities. This shows that a mixture of low and medium or high molecular weight polyvinyl alcohol can provide good durability while also having low viscosity. Thus, formulations including a mixture of two different polyvinyl alcohols can have good durability while also being easy to coat onto a substrate.

While the disclosure has been described with reference to certain examples, various modifications, changes, omissions, and substitutions can be made without departing from the spirit of the disclosure. It is intended, therefore, that the disclosure be limited only by the scope of the following claims.

What is claimed is:

1. A primer composition, comprising:
    a polyvinyl alcohol having a weight average molecular weight from about 50,000 Mw to about 250,000 Mw;
    a cationic salt present in an amount of at least 15 wt % of all dry components of the primer composition; and
    water,
    wherein the polyvinyl alcohol and cationic salt together make up at least 30 wt % of all dry components of the primer composition, and wherein the primer composition either is devoid of inorganic pigments or includes inorganic pigment in an amount of 5 wt % or less of all dry components of the primer composition.

2. The primer composition of claim 1, further comprising a latex polymer, wherein the polyvinyl alcohol, cationic salt and latex polymer make up at least 80 wt % of all dry components of the primer composition.

3. The primer composition of claim 2, wherein the latex polymer is a cationic latex polymer.

4. The primer composition of claim 1, wherein the polyvinyl alcohol is present at from 10 wt % to 30 wt % of all dry components of the primer composition.

5. The primer composition of claim 1, wherein the cationic salt is present at from 15 wt % to 70 wt % of all dry components of the primer composition.

6. The primer composition of claim 1, wherein the cationic salt comprises a cation of a metal selected from sodium, calcium, copper, nickel, magnesium, zinc, barium, iron, aluminum, or chromium.

7. The primer composition of claim 1, wherein the composition is substantially devoid of water-soluble polymers other than polyvinyl alcohol.

8. The primer composition of claim 1, further comprising a wax.

9. The primer composition of claim 1, wherein the polyvinyl alcohol has a weight-average molecular weight from about 74,000 Mw to about 160,000 Mw and a degree of hydrolysis from about 78 mol % to about 100 mol %.

10. The primer composition of claim 1, wherein the polyvinyl alcohol is a mixture of a first polyvinyl alcohol having a molecular weight less than about 50,000 Mw and a second polyvinyl alcohol having a molecular weight from about 50,000 Mw to about 250,000 Mw, wherein the overall weight average molecular weight of the mixture is from about 50,000 Mw to about 250,000 Mw.

11. A method of coating a media substrate, comprising applying a primer composition to a media substrate, wherein the primer composition comprises a polyvinyl alcohol having a weight average molecular weight from about 50,000 Mw to about 250,000 Mw, a cationic salt present in an amount of at least 15 wt % of all dry components of the primer composition, and water, wherein the polyvinyl alcohol and cationic salt make up at least 30 wt % of all dry components of the primer composition, and wherein the primer composition either is devoid of inorganic pigments or includes inorganic pigment in an amount of 5 wt % or less of all dry components of the primer composition.

12. The method of claim 11, wherein the primer composition further comprises a latex polymer, wherein the polyvinyl alcohol is present at from 10 wt % to 30 wt %; cationic salt is present at from 30 wt % to 70 wt %; and polyvinyl alcohol, cationic salt, and latex polymer collectively make up at least 80 wt % of all dry components of the primer composition.

13. The method of claim 11, wherein the primer composition comprises an inorganic pigment in an amount of about 5 wt % or less of all dry components of the primer composition.

14. A coated media substrate, comprising:
a media substrate; and
an ink-receiving primer layer coated on a surface of the media substrate, the ink-receiving primer layer comprising:
a polyvinyl alcohol present having a weight average molecular weight from about 50,000 Mw to about 250,000 Mw; and
a cationic salt present in an amount of at least 15 wt % of all dry components of the primer layer,
wherein the polyvinyl alcohol and cationic salt together make up at least 30 wt % of all dry components of the primer layer, and wherein the primer layer either is devoid of inorganic pigments or includes inorganic pigment in an amount of 5 wt % or less of all dry components of the primer layer.

15. The coated media substrate of claim 14, wherein the media substrate is a nonporous offset media substrate.

16. The primer composition of claim 1, wherein the polyvinyl alcohol has a weight average molecular weight from about 205,000 Mw to about 250,000 Mw.

17. The primer composition of claim 1, wherein the cationic salt is present in an amount from 40 wt % to 50 wt % of all dry components of the primer composition.

18. The primer composition of claim 1, further comprising a latex polymer in an amount from 20 wt % to 30 wt % of all dry components of the primer composition.

* * * * *